United States Patent
Roach et al.

(10) Patent No.: US 10,392,949 B2
(45) Date of Patent: Aug. 27, 2019

(54) GAS TURBINE ENGINE WITH REINFORCED SPINNER

(71) Applicant: United Technologies Corporation, Hartford, CT (US)

(72) Inventors: James T. Roach, Vernon, CT (US); Grant O. Cook, III, Spring, TX (US); Colin J. Kling, Middletown, CT (US); James F. O'Brien, Glastonbury, CT (US); Shari L. Bugaj, Haddam, CT (US)

(73) Assignee: United Technologies Corporation, Farmington, CT (US)

( * ) Notice: Subject to any disclaimer, the term of this patent is extended or adjusted under 35 U.S.C. 154(b) by 1128 days.

(21) Appl. No.: 14/592,942

(22) Filed: Jan. 9, 2015

(65) Prior Publication Data

US 2015/0315922 A1 Nov. 5, 2015

Related U.S. Application Data

(60) Provisional application No. 61/947,138, filed on Mar. 3, 2014.

(51) Int. Cl.
*F01D 5/02* (2006.01)
*F01D 9/02* (2006.01)
(Continued)

(52) U.S. Cl.
CPC .............. *F01D 9/02* (2013.01); *F01D 5/02* (2013.01); *F01D 5/12* (2013.01); *F02C 7/04* (2013.01); *B64C 11/14* (2013.01); *F05D 2220/32* (2013.01); *F05D 2300/10* (2013.01); *F05D 2300/603* (2013.01); *F05D 2300/6034* (2013.01); *Y02T 50/672* (2013.01)

(58) Field of Classification Search
CPC . F01D 9/02; F01D 25/24; F01D 25/26; F01D 25/28; F05D 2300/10; F05D 2300/702; F05D 2220/32
USPC ...................................... 415/218.1
See application file for complete search history.

(56) References Cited

U.S. PATENT DOCUMENTS

| | | | |
|---|---|---|---|
| 4,393,650 A | | 7/1983 | Pool |
| 4,863,354 A | * | 9/1989 | Asselin .................. B64C 11/14 |
| | | | 415/175 |

(Continued)

FOREIGN PATENT DOCUMENTS

| | | |
|---|---|---|
| EP | 1136353 A2 | 9/2001 |
| EP | 2014551 A1 | 1/2009 |

(Continued)

OTHER PUBLICATIONS

European Search Report for European Patent Application No. 15157399.5 dated Jul. 22, 2015.

(Continued)

*Primary Examiner* — Christopher Verdier
*Assistant Examiner* — Jason Mikus
(74) *Attorney, Agent, or Firm* — Carlson, Gaskey & Olds, P.C.

(57) ABSTRACT

A spinner for a gas turbine engine comprises an outer shell for defining an airflow path when mounted in a gas turbine engine. An inner surface is provided with a plurality of webs. A gas turbine engine and a fan section for a gas turbine engine are also disclosed.

15 Claims, 4 Drawing Sheets

(51) Int. Cl.
*F01D 5/12* (2006.01)
*F02C 7/04* (2006.01)
*B64C 11/14* (2006.01)

(56) References Cited

U.S. PATENT DOCUMENTS

| | | | |
|---|---|---|---|
| 4,892,269 | A | 1/1990 | Greco et al. |
| 5,149,251 | A * | 9/1992 | Scanlon ................. B64C 11/14 416/224 |
| 5,182,906 | A | 2/1993 | Gilchrist et al. |
| 6,358,014 | B1 * | 3/2002 | Chou ...................... B64C 11/14 29/889.1 |
| 6,364,614 | B1 | 4/2002 | Mnatsakanian |
| 6,416,280 | B1 | 7/2002 | Forrester et al. |
| 6,524,073 | B2 | 2/2003 | Mnatsakanian |
| 7,559,191 | B2 | 7/2009 | Parks |
| 8,251,670 | B2 * | 8/2012 | Anghileri ............... B64D 33/02 416/245 R |
| 2009/0016872 | A1 | 1/2009 | Anghileri |
| 2010/0051112 | A1 * | 3/2010 | Dieling .................... F02C 7/04 137/15.1 |
| 2013/0294894 | A1 * | 11/2013 | Kline ...................... F02C 7/055 415/151 |

FOREIGN PATENT DOCUMENTS

| | | |
|---|---|---|
| EP | 2570254 A1 | 3/2013 |
| KR | 10-1230263 | 6/2012 |
| WO | 02/20349 A1 | 3/2002 |

OTHER PUBLICATIONS

Notice of Opposition of EP Patent No. 2915742, United Technologies Corporation opposed by Safran Aircraft Engines, dated Aug. 9, 2017.
Chevalier, André, Guide to the Industrial Draftsman, Edition 2004.
Introduction to Plastics and Composites in Mechanics, Engineering Techniques B5170 VI, published Aug. 10, 1996.
Assembling Composites—Strengths of Bonding, Techniques of the Engineer BM7624 VI, published on Jul. 10, 2003.
Interlocutory Decision in Opposition Proceedings of EP Patent No. 2915742, United Technologies Corporation opposed by Safran Aircraft Engines, dated Dec. 5, 2018.
Minutes of the Oral Proceedings before the Opposition Division, Opposition of EP Patent No. 2915742, United Technologies Corporation opposed by Safran Aircraft Engines, dated Dec. 5, 2018.

* cited by examiner

GAS TURBINE ENGINE WITH REINFORCED SPINNER

CROSS-REFERENCE TO RELATED APPLICATION

This application claims priority to U.S. Provisional Patent Application No. 61/947,138, filed Mar. 3, 2014.

BACKGROUND OF THE INVENTION

This application relates to a relatively lightweight spinner for use in a gas turbine engine.

Gas turbines are known and, typically, include a fan rotor rotating with a plurality of fan blades. A spinner extends outwardly of the fan rotor to provide a portion of a nose cone.

The fan blades deliver air into a bypass duct as propulsion air and into a core engine.

Air in the core engine passes to a compressor where it is compressed and delivered into a combustion section. The air is mixed with fuel and ignited in the combustion section and products of this combustion pass downstream over turbine rotors driving them to rotate.

Historically, a fan drive turbine rotor rotated with the fan rotor at a single speed. However, it would be desirable to have the fan rotate at slower speeds than the turbine rotor. Thus, recently, a gear reduction has been placed between the fan drive turbine and the fan rotor.

With the use of the gear reduction, the size of the fan blades and rotor has increased dramatically. As the size of the fan rotor and blades increase, so does the size of the spinner. Further, as the size of these components has increased, the likelihood of contact from hail, birds, etc. has also increased. Thus, the spinner and the other components must withstand these impacts.

Historically, to make a spinner more resistant to impact, the thickness of the wall of the spinner has increased. This has resulted in undesirably high weight.

SUMMARY OF THE INVENTION

In a featured embodiment, a spinner for a gas turbine engine comprises an outer shell for defining an airflow path when mounted in a gas turbine engine. An inner surface is provided with a plurality of webs.

In another embodiment according to the previous embodiment, the plurality of webs extend from the inner surface of the spinner and from an upstream ring to a downstream ring which also extend inwardly from the inner surface of the spinner.

In another embodiment according to any of the previous embodiments, the webs, the outer ring and the inner ring are formed as a separate part from the outer surface.

In another embodiment according to any of the previous embodiments, the webs and the outer shell are formed of different materials.

In another embodiment according to any of the previous embodiments, the webs and the outer shell are molded as a single component.

In another embodiment according to any of the previous embodiments, the web and the outer shell are formed by at least one of a laminated material system, braided, woven, or a material system containing randomly orientated fibers.

In another embodiment according to any of the previous embodiments, the web and the outer shell are formed by metal.

In another embodiment according to any of the previous embodiments, the plurality of webs are provided by truss networks.

In another featured embodiment, a fan section for a gas turbine engine comprises a fan rotor carrying a plurality of fan blades and a spinner. The spinner has an outer shell for defining an airflow path when mounted in a gas turbine engine, and an inner surface, which is provided with a plurality of webs.

In another embodiment according to the previous embodiment, the plurality of webs extend from the inner surface of the spinner and from an upstream ring to a downstream ring which also extend inwardly from the inner surface of the spinner.

In another embodiment according to any of the previous embodiments, the web, the upstream ring and the downstream ring are formed as a separate part from the outer surface.

In another embodiment according to any of the previous embodiments, the webs and the outer shell are molded as a single component.

In another embodiment according to any of the previous embodiments, the webs and the outer shell are formed by at least one of a laminated material system, braided, woven, or a material system containing randomly orientated fibers.

In another embodiment according to any of the previous embodiments, a nose cone is secured to the spinner.

In another embodiment according to any of the previous embodiments, the plurality of webs are provided by truss networks.

In another embodiment according to any of the previous embodiments, the webs and the outer shell are formed of different materials.

In another featured embodiment, a gas turbine engine comprises a fan, a compressor and a turbine. The fan includes a fan rotor carrying a plurality of fan blades and a spinner. The spinner has an outer surface for defining an airflow path when mounted in a gas turbine engine, and an inner surface, which is provided with a plurality of webs.

In another embodiment according to the previous embodiment, the plurality of webs extend from the inner surface of the spinner and from an upstream ring to a downstream ring which also extend inwardly from the inner surface of the spinner.

In another embodiment according to any of the previous embodiments, the web, the inner ring and the outer ring are formed as a separate part from the outer surface.

In another embodiment according to any of the previous embodiments, the webs and the outer shell are molded as a single component.

In another embodiment according to any of the previous embodiments, the webs and the outer shell are formed by at least one of a laminated material system, braided, woven, or a material system containing randomly orientated fibers.

In another embodiment according to any of the previous embodiments, the webs and the outer shell are formed of different materials.

In another embodiment according to any of the previous embodiments, a nose cone is secured to the spinner.

In another embodiment according to any of the previous embodiments, the plurality of webs are provided by truss networks.

In another embodiment according to any of the previous embodiments,

These and other features may be best understood from the following drawings and specification.

DETAILED DESCRIPTION

Figure 1:
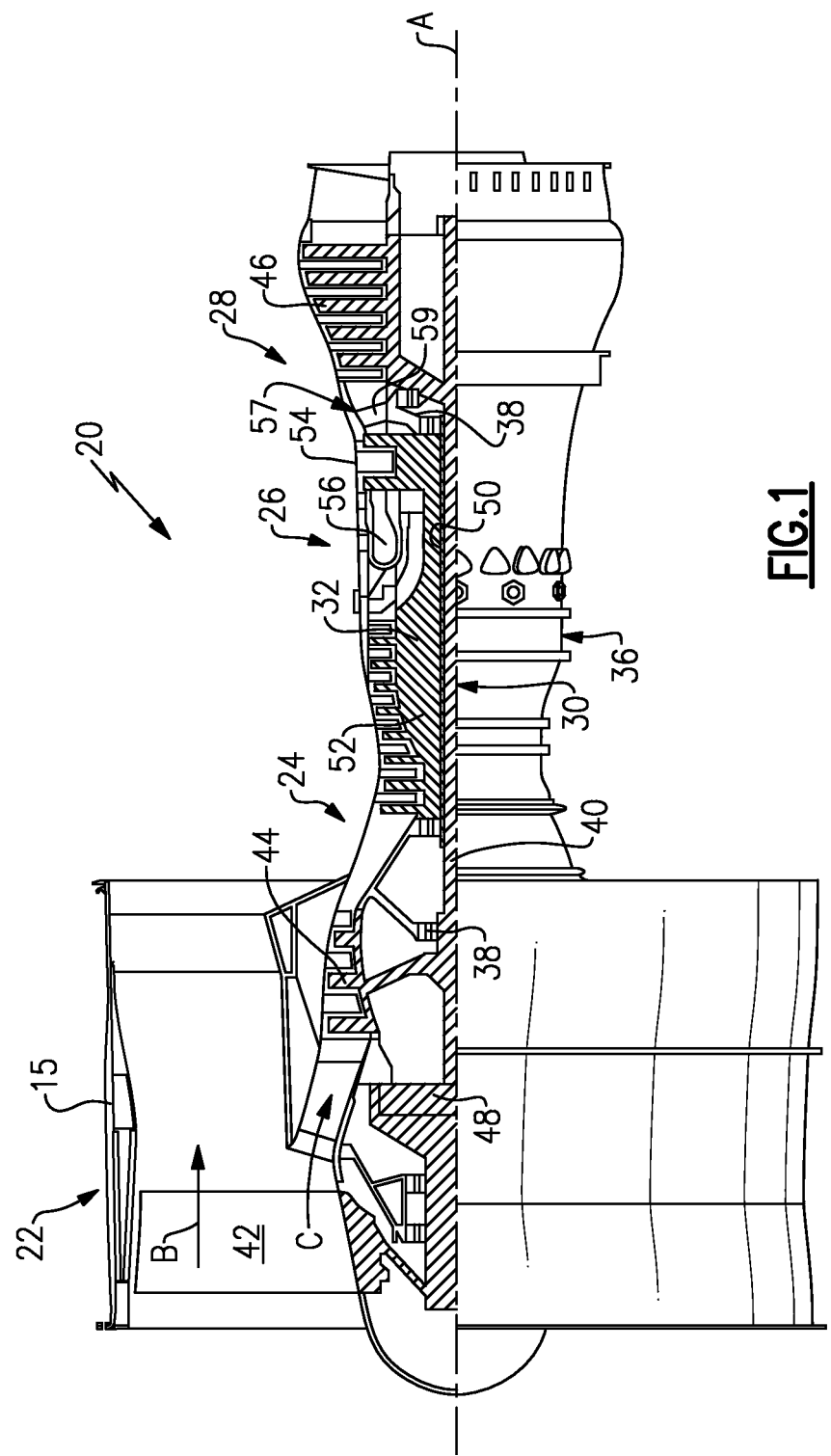
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low-speed spool 30 generally includes an inner shaft 40 that interconnects a fan 42, a first (or low-pressure) compressor 44 and a first (or low-pressure) turbine 46. The inner shaft 40 is connected to the fan 42 through a speed-change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a second (or high-pressure) compressor 52 and a second (or high-pressure) turbine 54. A combustor 56 is arranged in exemplary gas turbine 20 between the high-pressure compressor 52 and the high-pressure turbine 54. A mid-turbine frame 57 of the engine static structure 36 is arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 57 includes airfoils 59 which are in the core airflow path C. The turbines 46, 54 rotationally drive the respective low-speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition, typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry-standard parameter of pound-mass (lbm) of fuel being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan-tip speed in ft/sec divided by an industry-standard temperature correction of [(Tram ° R)/(518.7° R)]$^{0.5}$. The "Low corrected fan-tip speed" as disclosed herein according to one non-limiting embodiment is less than about 1150 ft/second.

Figure 2:
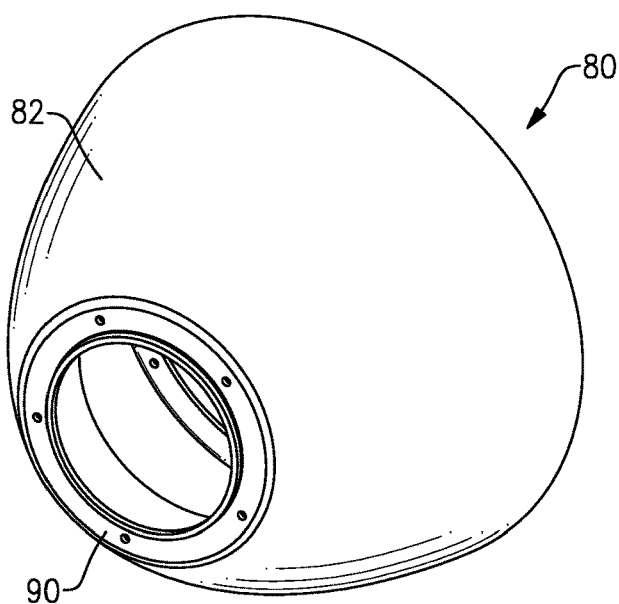
FIG. 2 is an outer perspective view of a spinner.

FIG. 2 shows a spinner 80 which may be incorporated as part of the rotor for the fan section 22 of FIG. 1. An outer shell 82 defines an airflow path as part of the fan rotor. A mount flange 90 at an upstream end will receive a nose cone/cap as known.

Figure 3A:
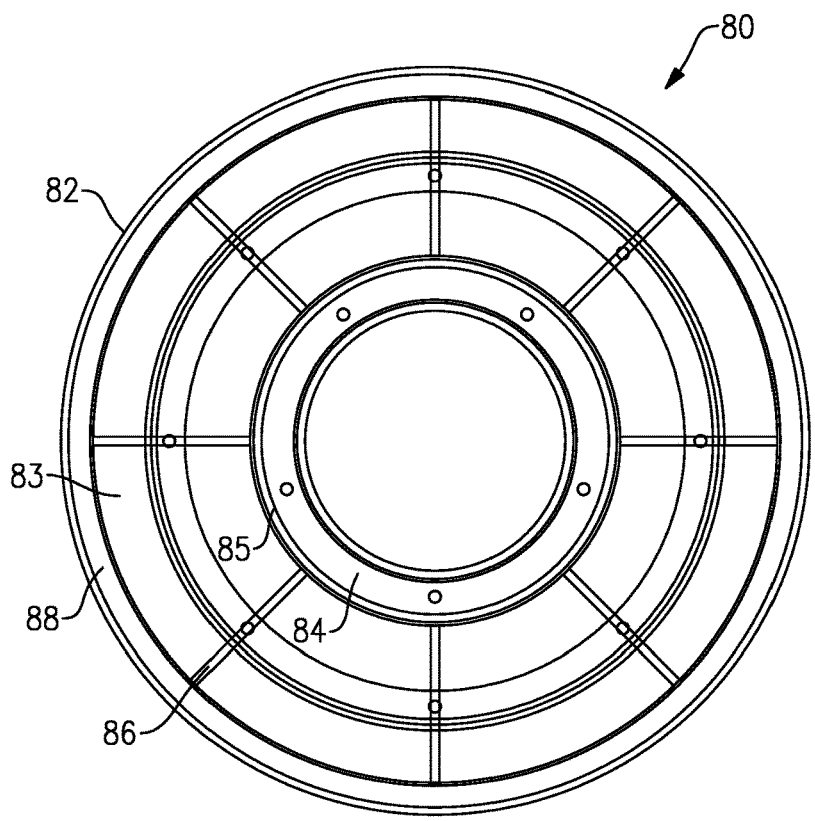
FIG. 3A shows an interior of the spinner.

FIG. 3A shows the interior of the spinner 80. A plurality of webs 86 are attached to an interior wall 83 of the spinner. The webs 86 connect an inner ring 85 to an outer ring 88. An inner surface 84 of the mount flange 90 is also illustrated. The webs 86 provide stiffness and impact resistance to the outer shell 82 of the spinner 80 without requiring a uniform increase in thickness of the wall. Thus, the weight of the spinner 80 is reduced compared to the prior art.

Figure 3B:
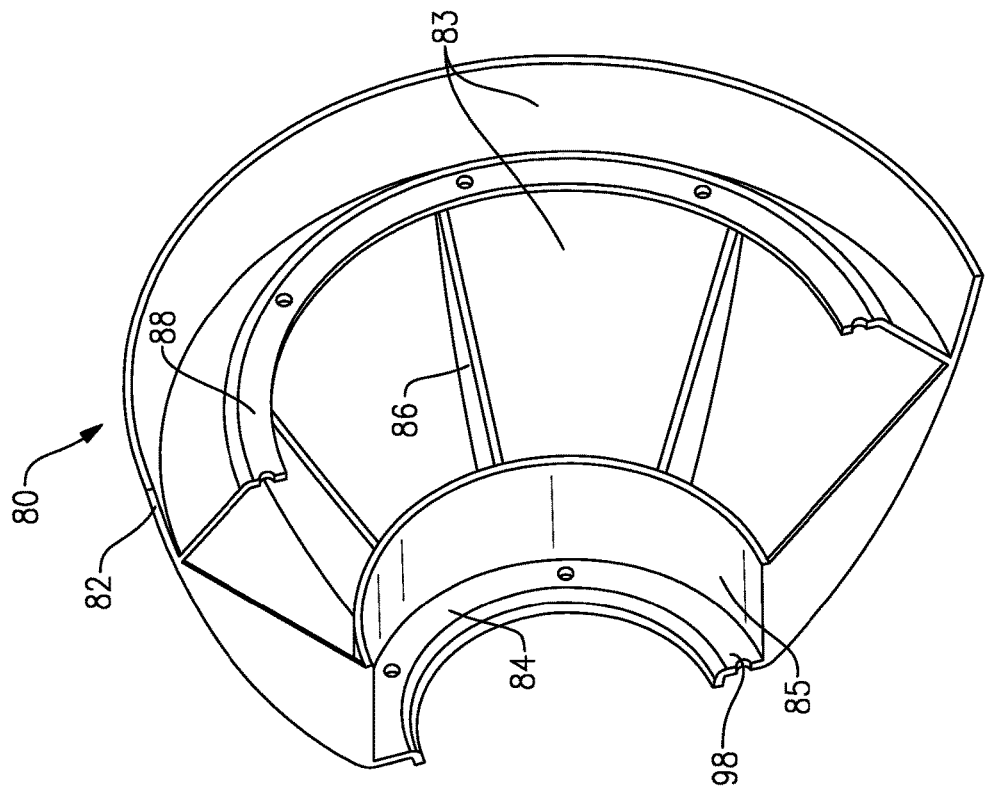
FIG. 3B is another view of the interior.
Figure 3B:
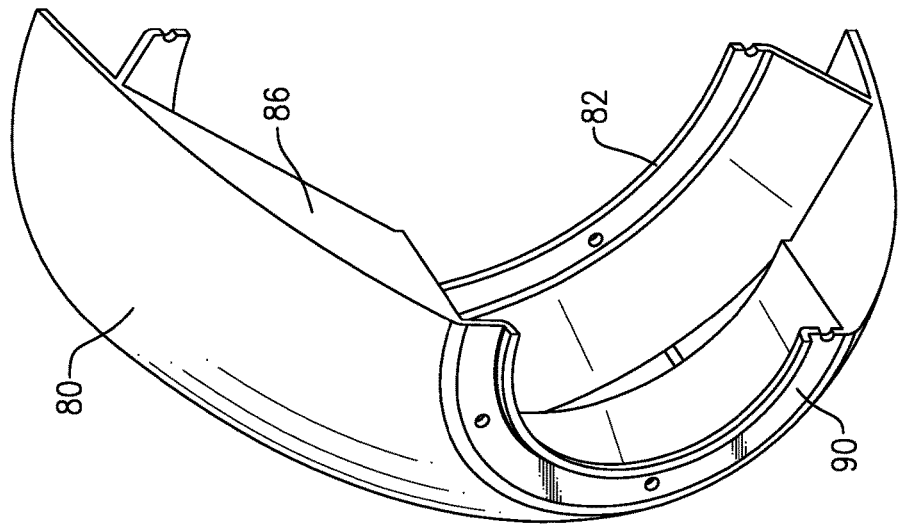

FIG. 3B shows the details including the webs 86 secured to the inner wall 83.

Figure 4A:
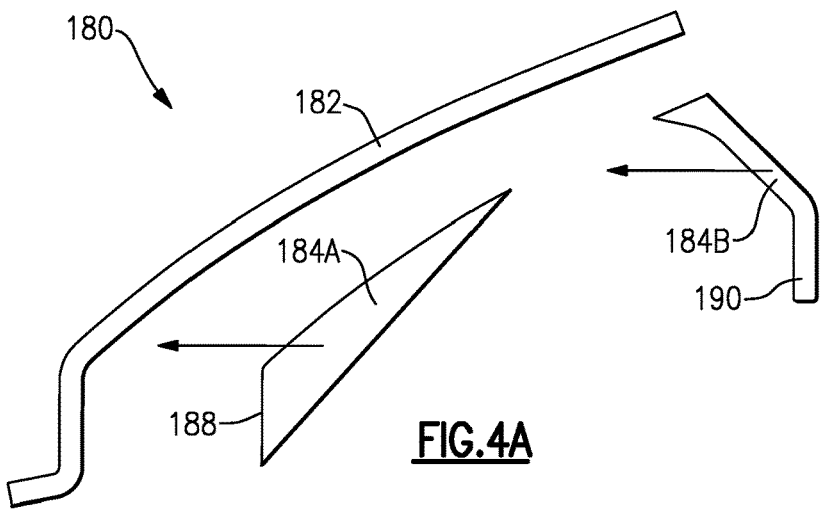
FIG. 4A schematically shows an assembly step.
Figure 4B:
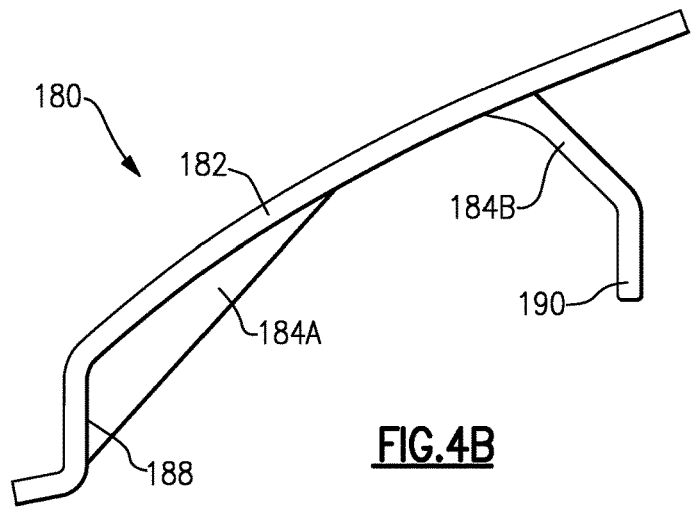
FIG. 4B shows the spinner after the FIG. 4A step.

FIG. 4A shows an embodiment 180 in cross section wherein an outer shell portion 182 is formed as one component to which is attached a web structure 184A/B. The web structure 184A/B extends from an inner ring 188 to an outer ring 190 and both rings 188 and 190 generally extend about 360°. FIG. 4B shows the complete spinner in cross section. As can be appreciated from FIGS. 3A and 3B, the web structure 184A/B and inner ring 188 and outer ring 190 would each comprise a ring 188/190 extending about 360° with a plurality of circumferentially spaced webs 184A/B, respectively.

Figure 5:
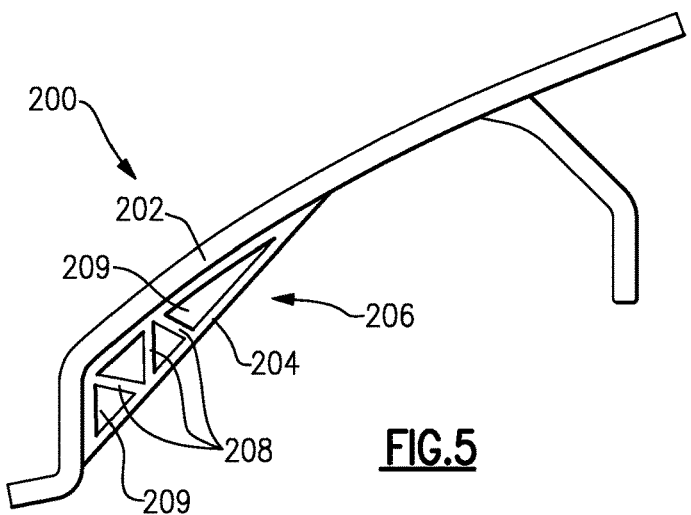
FIG. 5 shows an embodiment.

FIG. 5 shows an embodiment 200 in cross section with outer shell 202 wherein the web structure 204 is provided as a truss network 206 with crossing beams 208 and hollows or cutouts 209, enabling further weight optimization of the inner geometry. Such weight-optimized structures can also be used in other embodiments, such as the inner ring 85 in FIG. 3B.

The embodiments of FIGS. 3A and 3B may be formed as shown in FIG. 4 and, thus, attached after the two components are initially formed. On the other hand, the two may be formed as a single molded product. As an example, an injection molding process may be utilized to form both. The spinner may also be constructed using a variety of techniques including, but not limited to, a metallic, a laminated material system, braided, woven or other material systems that may contain randomly orientated fibers. The web structure itself, if formed separately, may also be included as a metallic or composite structure and then secured through appropriate techniques to a shell including, but not limited to, mechanical snaps, adhesive bonding, or mechanical fasteners.

The web-reinforced spinner cone may be manufactured for a much lower cost than the thicker prior art. Further, the overall weight is reduced. The web feature carries and distributes loads through the part more efficiently than a constant-thickness structure. Further, the web will help prevent warping and distortion caused by cooling after molding. Such web-reinforced spinners are more resistant to impact such as a bird strike.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A spinner for a gas turbine engine comprising:
an outer shell for defining an airflow path when mounted in a gas turbine engine;
an inner surface, said inner surface being provided with a plurality of webs;
said plurality of webs extending from said inner surface of said spinner and from an upstream ring to a downstream ring, and said upstream and downstream rings also extend inwardly from said inner surface of said spinner;
said webs, said upstream ring and said downstream ring being formed as a separate part from said outer shell; and
said webs and said outer shell are formed of different materials.

2. The spinner as set forth in claim 1, wherein said web and said outer shell are formed by at least one of a laminated material system, braided, woven, or a material system containing randomly orientated fibers.

3. The spinner as set forth in claim 1, wherein said web and said outer shell are formed by metal.

4. The spinner as set forth in claim 1, wherein said plurality of webs are provided by truss networks.

5. A fan section for a gas turbine engine comprising:
a fan rotor carrying a plurality of fan blades and a spinner,
said spinner having an outer shell for defining an airflow path when mounted in a gas turbine engine, and an inner surface, said inner surface being provided with a plurality of webs;
said plurality of webs extending from said inner surface of said spinner and from an upstream ring to a downstream ring, and said upstream and downstream rings also extend inwardly from said inner surface of said spinner;
said webs, said upstream ring and said downstream being are formed as a separate part from said outer shell; and
said webs and said outer shell are formed of different materials.

6. The fan section as set forth in claim 5, wherein said webs and said outer shell are formed by at least one of a laminated material system, braided, woven, or a material system containing randomly orientated fibers.

7. The fan section as set forth in claim 5, wherein a nose cone is secured to said spinner.

8. The fan section as set forth in claim 5, wherein said plurality of webs are provided by at least one of truss networks and cutouts.

9. A gas turbine engine comprising:
a fan, a compressor and a turbine, the fan including a fan rotor carrying a plurality of fan blades and a spinner;
said spinner having an outer surface for defining an airflow path when mounted in a gas turbine engine, and an inner surface, said inner surface being provided with a plurality of webs;
said plurality of webs extending from said inner surface of said spinner and from an upstream ring to a downstream ring, and said upstream and downstream rings also extend inwardly from said inner surface of said spinner;
said webs, said upstream ring and said downstream ring are formed as a separate part from said outer surface; and
said webs and said outer shell are formed of different materials.

10. The gas turbine engine as set forth in claim 9, wherein said webs and said outer shell are formed by at least one of a laminated material system, braided, woven, or a material system containing randomly orientated fibers.

11. The gas turbine engine as set forth in claim 9, wherein a nose cone is secured to said spinner.

12. The gas turbine engine as set forth in claim 9, wherein said plurality of webs are provided by at least one of truss networks and cutouts.

13. The spinner as set forth in claim 1, wherein the plurality of webs, the upstream ring and the downstream ring each comprise a ring extending 360° about a central axis, and with a plurality of circumferentially spaced webs.

14. The fan section as set forth in claim 5, wherein the plurality of webs, the upstream ring and the downstream ring each comprise a ring extending 360° about a central axis, and with a plurality of circumferentially spaced webs.

15. The gas turbine engine as set forth in claim 9, wherein the plurality of webs, the upstream ring and the downstream ring each comprise a ring extending 360° about a central axis, and with a plurality of circumferentially spaced webs.

* * * * *